(12) United States Patent
Oonaka

(10) Patent No.: US 7,526,363 B2
(45) Date of Patent: Apr. 28, 2009

(54) ROBOT FOR PARTICIPATING IN A JOINT PERFORMANCE WITH A HUMAN PARTNER

(75) Inventor: Shinichi Oonaka, Tokyo (JP)

(73) Assignee: NEC Corporation, Tokyo (JP)

( * ) Notice: Subject to any disclaimer, the term of this patent is extended or adjusted under 35 U.S.C. 154(b) by 746 days.

(21) Appl. No.: 11/116,436

(22) Filed: Apr. 28, 2005

(65) Prior Publication Data

US 2005/0246063 A1 Nov. 3, 2005

(30) Foreign Application Priority Data

Apr. 28, 2004 (JP) .............................. 2004-132789
Aug. 20, 2004 (JP) .............................. 2004-241523

(51) Int. Cl.
*G06F 19/00* (2006.01)
(52) U.S. Cl. ...................... 700/245; 446/397
(58) Field of Classification Search ........................ None
See application file for complete search history.

(56) References Cited

U.S. PATENT DOCUMENTS

| | | | | |
|---|---|---|---|---|
| 4,221,927 A * | 9/1980 | Dankman et al. | ........... | 367/198 |
| 5,281,143 A * | 1/1994 | Arad et al. | ................... | 434/185 |
| 6,292,713 B1 * | 9/2001 | Jouppi et al. | ................ | 700/245 |
| 6,585,556 B2 * | 7/2003 | Smirnov | ...................... | 446/175 |
| 6,971,943 B1 * | 12/2005 | Schulze | ...................... | 446/327 |
| 2004/0210345 A1 * | 10/2004 | Noda et al. | ................. | 700/245 |
| 2005/0154265 A1 * | 7/2005 | Miro et al. | ................... | 600/300 |

FOREIGN PATENT DOCUMENTS

JP 2000-353012 12/2000

OTHER PUBLICATIONS

Hara, Fumio; Kobayashi, Hiroshi; "Real-time Facial Interaction between Human and 3D Face Robot Agent"; IEEE International Workshop on Robot and Human Communication; 1996.*
Thrun et al.; "Probabilistic Algorithms and the Interactive Museum Tour-Guide Robot Minerva"; Journal of Robotics Research; 2000.*

* cited by examiner

*Primary Examiner*—Khoi Tran
*Assistant Examiner*—Nicholas Kiswanto
(74) *Attorney, Agent, or Firm*—Whitman Curtis Christofferson & Cook, PC

(57) ABSTRACT

For a joint performance of a dialogue between a human partner and a robot, the robot analyzes phrase and action of the partner to detect a recognized behavior of the partner and analyze a state of audience listening to utterances from the partner and the robot to detect a recognized state of the audience. A scenario describing the dialogue is stored in entries of a memory. The memory is successively referenced entry by entry and a check is made for a match between an utterance by the partner or the robot to a reaction from the audience. Responsive to a currently detected audience state, a corresponding robot behavior is determined. Preferably, possible partner's behaviors and expected audience states are mapped in a database to specified robot behaviors. The database is searched for a specified robot behavior corresponding to a currently sensed partner behavior or a currently sensed audience state.

23 Claims, 9 Drawing Sheets

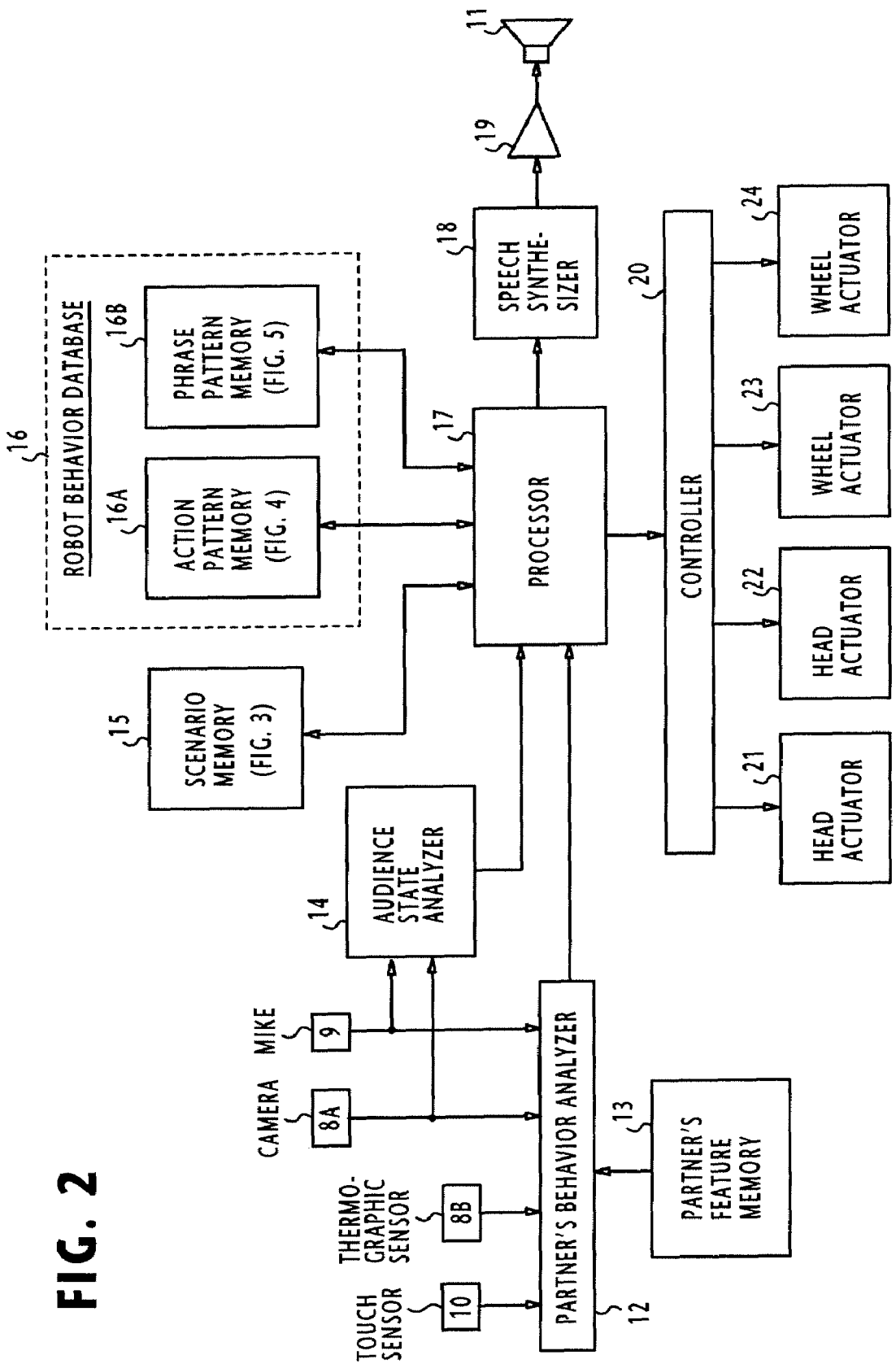

FIG. 3  SCENARIO MEMORY

| NO. | PARTNER'S BEHAVIOR | ROBOT BEHAVIOR DB KEY | ROBOT BEHAVIOR (SEE FIGS. 4, 5) | R-T-S | AUDIENCE | PERFORMED STEPS |
|---|---|---|---|---|---|---|
| 1 | "SELF-INTRODUCTION" | — | | PAR. | × | PASS 1 (101~106,121,122) |
| 2 | — | B001 | "SELF-INTRODUCTION" | ROB. | × | PASS 2 (101,102,115,116,120~122) |
| 3 | SLAPS ROBOT ON THE HEAD | — | | PAR. | × | PASS 1 |
| 4 | "GREETING PHRASE" | B002 | "URGING PHRASE" | PAR. | × | PASS 3 (101~109,121,122) |
| 5 | — | B003 | "URGING PHRASE" | | | PASS 1 |
| | | | | | | PASS 3 |
| | | B004 | "REACTIVE PHRASE" | ROB. | LARGE | PASS 4 (101,102,115~118,120~122) |
| 6 | "OPENING PHRASE" | — | (SPECIFIED BY DB 16) | | | PASS 5 (101,102,115~122) |
| | | — | (SPECIFIED BY DB 16) | PAR. | LARGE | PASS 6 (101~104,111,112,121,122) |
| 7 | — | B006 | "COMICAL PHRASE" | ROB. | × | PASS 7 (101~104,111~114,120~122) |
| | | | | | | PASS 2 |
| 8 | — | B007 | "REACTIVE PHRASE" | ROB. | LAUGHTER | PASS 4 |
| | | — | (SPECIFIED BY DB 16) | | | PASS 5 |
| 9 | "COMICAL PHRASE" | — | (SPECIFIED BY DB 16) | PAR. | LAUGHTER | PASS 6 |
| | | | | | | PASS 7 |
| ---- | ---- | ---- | ---- | ---- | ---- | ---- |

FIG. 4
ACTION PATTERN MEMORY 16A

| DATABASE KEY | ACTION | SENSED PARTNER'S BEHAVIOR | SENSED AUDIENCE STATE |
|---|---|---|---|
| A001 | ACTION 1 | | |
| A002 | ACTION 2 | | |
| A003 | ACTION 3 | | |
| A004 | ACTION 4 | | |
| A005 | ACTION 5 | | |
| A006 | ACTION 6 | | |
| A007 | ACTION 7 | | |
| ⋮ | ⋮ | ⋮ | |

FIG. 5
PHRASE PATTERN MEMORY 16B

| DATABASE KEY | PHRASE | SENSED PARTNER'S BEHAVIOR | SENSED AUDIENCE STATE |
|---|---|---|---|
| B001 | "MY NAME IS PAPERO" | | |
| B002 | "SLAP MY HEAD (WHISPER)" | | |
| B003 | "HAPPY TO SEE ALL OF YOU (WHISPER)" | | |
| B004 | "HELLO, EVERYBODY" | | |
| B005 | "WE ARE GOING TO PLAY .....(WHISPER)" | | |
| B006 | "COMICAL PHRASE" | | |
| B007 | "REACTIVE PHRASE" | | |
| B008 | | | |
| B009 | | | |
| ⋮ | ⋮ | ⋮ | ⋮ |

FIG. 7
SCENARIO MEMORY

| NO. | PARTNER'S BEHAVIOR | ROBOT BEHAVIOR | | R-T-S | AUDIENCE |
|---|---|---|---|---|---|
| | | DB KEY | (SEE FIGS. 4, 5) | | |
| 11 | "COMICAL PHRASE" | — | (SPECIFIED BY DB 16) | PAR. | ○ |
| 12 | — | B006 | "COMICAL PHRASE" | ROB. | × |
| 13 | — | — | (SPECIFIED BY DB 16) | ROB. | ○ |
| 14 | ---------- | ---------- | ---------- | ---------- | ---------- |

ROBOT FOR PARTICIPATING IN A JOINT PERFORMANCE WITH A HUMAN PARTNER

BACKGROUND OF THE INVENTION

1. Field of the Invention

The present invention relates generally to robots, and more specifically to a robot for participating in a joint performance with a human partner and a method of controlling a robot. The robot is useful for jointly performing a comic dialogue with a comedian partner in a theater and for assisting a schoolteacher in a classroom.

2. Description of the Related Art

Recent advances in microprocessors and robotics have culminated in the development of two-footed robots known under the trade names of "Aibo" and "Asimo". Another example of robot is a nursing robot which is described in Japanese Patent Publication 2000-353012 for nursing the aged or the handicapped. The robot has an eye whose viewing point is determined with respect to the position of a user. In response to a voice command from the user, the robot interprets the voice command at the determined viewing point and determines its direction of motion.

Although the known robots are capable of recognizing human voice and of using light and sound to express their own feelings, their performance is limited to responding to only a simple phrase or action by a user. Therefore, their performance is a series of mutually unrelated behaviors.

However, a need exists to provide a robot capable of participating in a joint performance of dialogue with a human partner.

SUMMARY OF THE INVENTION

It is therefore an object of the present invention to provide a robot and a method of controlling a robot for participating in a joint performance with a human partner.

According to a first aspect of the present invention, there is provided a robot comprising a first analyzer for analyzing phrase and action of a human partner to detect a recognized behavior of the partner, a second analyzer for analyzing a state of a plurality of people listening to utterances from the partner and the robot to detect a recognized state of the people, a scenario memory for storing a scenario describing a dialogue between the partner and the robot, and a processor for making reference to a portion of the scenario in the memory according to one of the recognized behavior of the partner and the recognized state of the people, and determining a behavior of the robot according to the referenced portion of the scenario.

According to a second aspect, the present invention provides a robot control system for controlling a robot, comprising a first analyzer for analyzing phrase and action of a human partner to detect a recognized behavior of the partner, a second analyzer for analyzing a state of a plurality of people listening to utterances from the partner and the robot to detect a recognized state of the people, a scenario memory for storing a scenario describing a dialogue between the partner and the robot, and a processor for making reference to a portion of the scenario in the memory according to one of the recognized behavior of the partner and the recognized state of the people, and determining a behavior of the robot according to the referenced portion of the scenario.

According to a third aspect, the present invention provides a method of controlling a robot, comprising the steps of (a) storing a scenario describing a dialogue between a human partner and the robot in a memory, (b) analyzing phrase and action of a human partner to detect a recognized behavior of the partner and analyzing a state of a plurality of people listening to utterances from the partner and the robot to detect a recognized state of the people, and (c) making reference to a portion of the scenario in the memory according to at least one of the recognized behavior of the partner and the recognized state of the people and determining a behavior of the robot according to the referenced portion of the scenario.

According to a fourth aspect, the present invention provides a computer-readable storage medium containing a stored scenario describing a dialogue between a human partner and a robot and a program for controlling the robot, the program performing tie steps of (a) analyzing phrase and action of a human partner to detect a recognized behavior of the partner and analyzing a state of a plurality of people listening to utterances from the partner and the robot to detect a recognized state of the people, and (b) making reference to a portion of the stored scenario according to at least one of the recognized behavior of the partner and the recognized state of the people and determining a behavior of the robot according to the referenced portion of the scenario.

BRIEF DESCRIPTION OF THE DRAWINGS

The present invention will be described in detail further with reference to the following drawings, in which:

FIG. 2 is a block diagram of the robot of according to a first embodiment of the present invention, in which the robot acts as an artificial partner for jointly performing a comic dialogue with a human comedian partner;

FIG. 3 is an illustration of the scenario memory of FIG. 2 according to the first embodiment of the invention;

FIG. 4 is an illustration of the action pattern memory of the robot behavior database of FIG. 2 for comical actions to be performed by the robot;

FIG. 5 is an illustration of the phrase pattern memory of the robot behavior database for showing comical phrases to be uttered by the robot;

FIG. 7 is an illustration of a modified scenario memory according to a modification of the first embodiment of this invention;

DETAILED DESCRIPTION

Figure 1A:
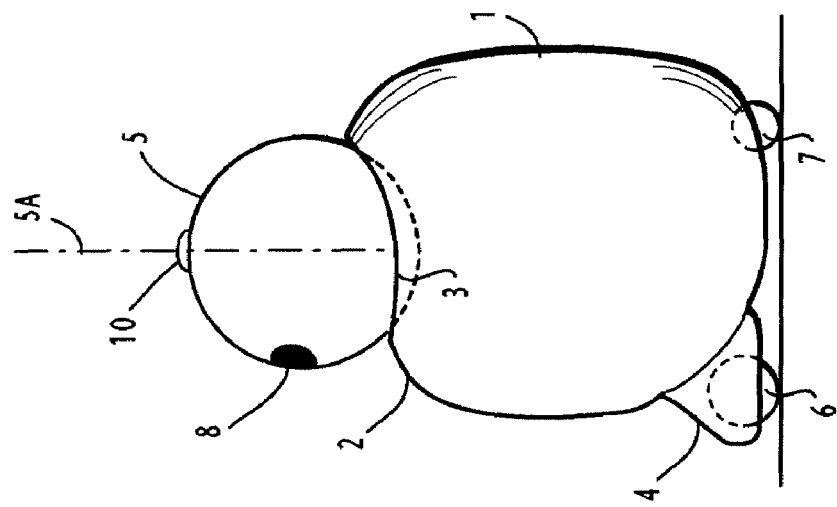
FIGS. 1A and 1B are front and side views of an entertainment robot of the present invention, respectively.
Figure 1B:
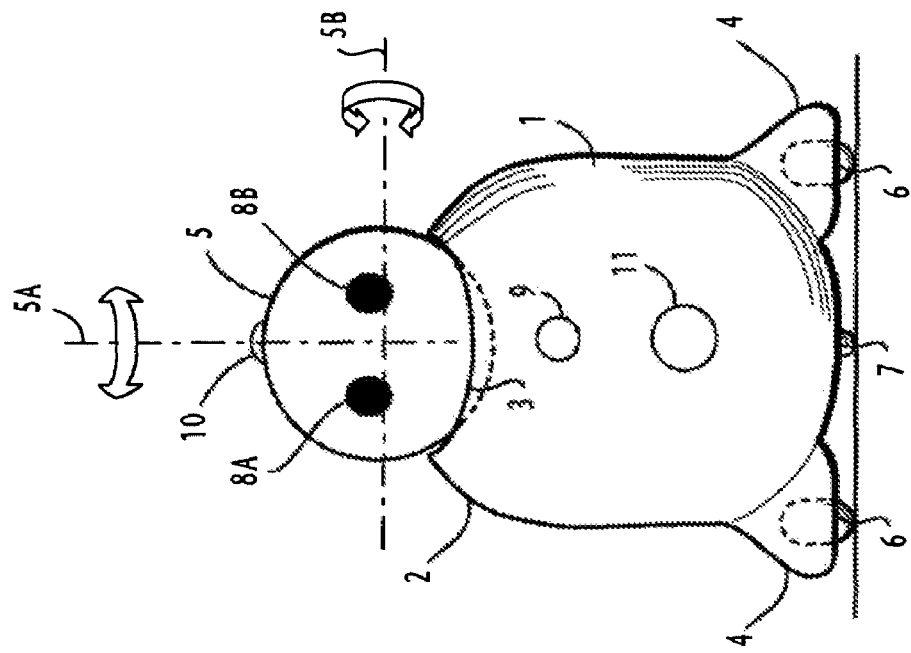

According to a first embodiment of the present invention, an entertainment robot is shown in FIGS. 1A and 1B. The entertainment robot is used on the stage of a hall or theater as an artificial comedian, standing on the side of a human comedian partner. They perform a comic dialogue by exchanging comical phrases with each other on a wide range of topics including social, political and human affairs.

The entertainment robot comprises a torso 1 of generally cylindrical structure with a rounded upper portion 2 having a circular opening 3 and a pair of limb portions 4 on its front side. A head 5 of spherical shape is partially submerged in the opening 3 and rotatably secured so that it can orient its face in a limited horizontal angle about a vertical axis 5A and in a limited vertical angle about a horizontal axis 5B. Each of the limb portions 4 extends outwards from the torso 1 and includes a driven wheel 6. A castor 7 is fitted to the bottom of torso 1 near its rear side so that the robot is capable of moving about on the stage.

Head 5 is provided with a CCD camera 8A in the position of an eye, a thermographic sensor 8B in the position of the other eye and a touch sensor 10 on top of the head. A microphone 9 and a loudspeaker 11 are provided on the front side of torso 1.

As shown in FIG. 2, the outputs of CCL camera 8A, thermographic sensor 8B, microphone 9 and touch sensor 10 are connected to a partner's behavior analyzer 12. Partner's behavior analyzer 12 uses its input signals to determine what the partner has behaved by consulting a partner's feature memory 13 in which a plurality of facial features and speech patterns of the partner are stored as references. Analyzer 12 uses the thermographic sensor 8B to analyze the feeling of the partner to detect a recognized partner's behavior.

The outputs of CCD camera 8A and microphone 9 are coupled to an audience state analyzer 14, which determines whether the theater audience is large or small and analyzes their reaction in response to amusing phrases or serious remarks from the performers.

A scenario memory 15 and a robot behavior database 16 are provided. Robot behavior database 16 includes an action pattern memory 16A and a phrase pattern memory 16B. The details of these memories will be described below.

The robot includes a pair of head actuators 21 and 22 for respectively controlling the orientation of the head 5 in vertical and horizontal angular positions and a pair of wheel actuators 23 and 24 for moving the robot in a specified direction. Controller 20 responds to the output signal from the processor 17 to individually control these actuators.

As shown in FIG. 3, the scenario memory 15 is divided into a plurality of entries (rows) numbered and arranged according to the scenario of a comic dialogue being played by the comedian partner and the robot.

Each entry is sub-divided into a plurality of fields (columns) 31 to 34. A specified partner's action or phrase is indicated in the field 31, and one or more database keys (A001 and B001, for example) are indicated in the field 32 for making a search through the robot database 16 for corresponding robot action and phrase. The field 33 of each entry is a right-to-speak field that indicates which of the comedian or robot has the right to speak first in that entry. The field 34 is an audience field for which the robot is programmed to consider an expected scale of audience (large or small) and an expected reaction of audience (laughter or no laughter). The symbol "x" in the audience field 34 indicates that there is no need for the robot to consider audience reaction.

Robot behavior field 32 of entries numbered 3, 5, 6, and 10 is further sub-divided into an upper sub-field and a lower sub-field. In the case of entry #3, the lower sub-field specifies an alternative robot's behavior to be performed when the partner fails to do according to the scenario specified in the partner's behavior field 31. In the entries #5, #6 and #10, the lower sub-field specifies an alternative robot's behavior to be performed when sensed audience state (scale or reaction) does not match the expected audience state specified in the audience field 34.

As shown in FIG. 4, the action pattern memory 16A of robot behavior database 16 has a plurality of entries (rows) in which database keys A001 through A008 are mapped to corresponding patterns of robot action and sensed partner's behaviors, which will be detected by the analyzer 12 Using the database key and a sensed partner's behavior, the action pattern memory 16A is searched for a corresponding pattern of action, which the robot is programmed to perform. The robot actions may include bowing, turning around, stepping forward and combinations of these actions.

As shown in FIG. 5, the phrase pattern memory 16B of robot behavior database 16 has a plurality of entries (rows) in which database keys B001 through B008 are mapped to corresponding phrase patterns of the robot and sensed partner's behaviors, which will be detected by the analyzer 12. Using the database key and a sensed partner's behavior, the phrase pattern memory 16B is searched for a corresponding phrase pattern, which the robot is programmed to utter.

In the above example, FIG. 3 shows phrase keys B001 to B007 of FIG. 4. In the entries of the scenario memory 15, action keys specified in FIG. 5 may be combined with the phrase keys to indicate a desired robot behavior.

Figure 6:
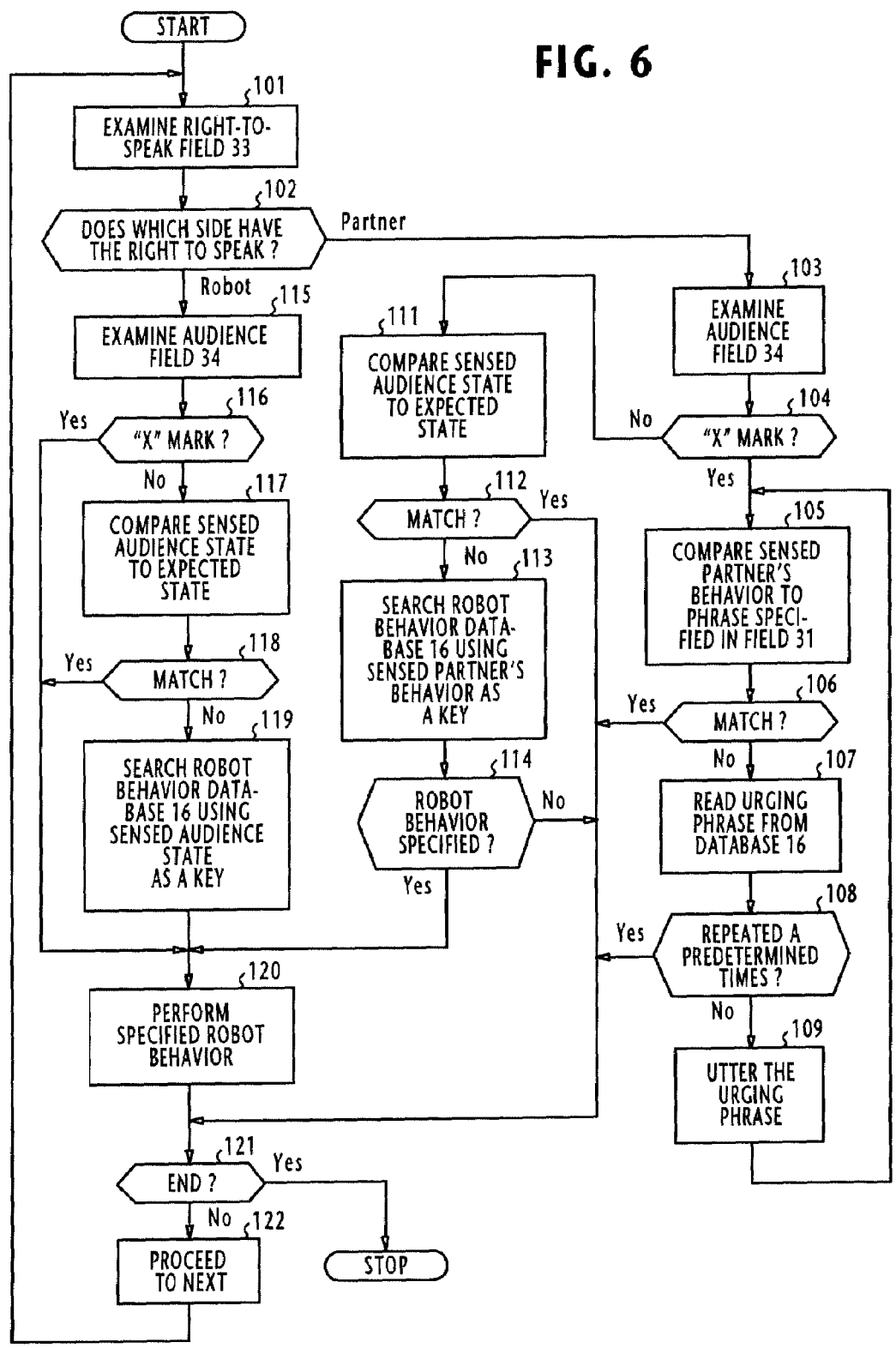
FIG. 6 is a flowchart of the operation of the processor of FIG. 2 according to the first embodiment.

The operation of processor 17 proceeds according to the flowchart of FIG. 6.

Processor 17 initially sets a pointer of the scenario memory 15 to the first entry and begins with step 101 by examining the right-to-speak field 33 of the entry of the scenario memory 15 indicated by the pointer. At step 102, the processor 17 determines which side has the right to speak, the comedian partner or the robot. If the partner has the right to speak, flow proceeds from step 102 to step 103 to examine the audience field 34 of the current entry and flow proceeds to step 104 to determine whether it is necessary to consider the audience reaction or state. If the audience field 34 is marked with the symbol "x", it is not necessary to consider the audience state and flow proceeds to step 105 to compare a partner's behavior (uttered phrase) detected by the analyzer 12 to the phrase specified in the partner's behavior field 31 of the current entry to detect a match (step 106). If they match, flow proceeds from step 106 to step 121 to check to see if the current entry is the last entry. If not, flow proceeds to step 122 to advance the pointer to the next entry. If the decision at step 106 is negative, flow proceeds to step 107 to read a robot behavior data from the lower sub-field of robot's behavior field 32.

If the partner fails to behave according to the scenario specified in the partner's behavior field 31 of the current entry, the decision at step 106 is negative and robot behavior data is read from the lower sub-field of robot behavior field 32 for urging the partner to perform the specified behavior. If the partner has failed to perform the specified behavior a predetermined number of times (step 108), flow proceeds to step 121. Otherwise, flow proceeds to step 109 to perform the specified behavior, and flow returns to step 105 to repeat the process.

If the audience field 34, examined at step 103, contains an expected audience state, the decision at step 104 is negative and flow proceeds to step 111 to turn the robot face towards the audience to sense the audience state by the audience state analyzer 14 and compares the sensed audience to the expected audience state for a match (step 112). If they match, flow proceeds to step 121. Otherwise, flow proceeds to step 113 to turn the robot face toward the partner to sense his behavior by the partner's behavior analyzer 12 and makes a search through the robot behavior database 16 for a corresponding robot behavior to be performed, using the sensed partner's behavior as a key. If a corresponding robot behavior is specified in the database 16 (step 114), flow proceeds to step 120 to perform a robot behavior specified in the robot behavior field 32 (or robot behavior database 16). Otherwise, flow proceeds to step 121.

If the right-to-speak field 33, referenced at step 101, indicates that the robot has the right to speak first in the current entry, flow proceeds from step 102 to step 115 to examine the audience field 34. If the audience field 34 contains an expected audience state, the decision at step 116 is negative and flow proceeds to step 117 to turn the robot face toward the audience to detect the audience state by the analyzer 14 and compares the sensed audience state to the expected state for a match (step 118). If they match, flow proceeds to step 120. Otherwise, flow proceeds to step 119 to read a key from the lower sub-field of the robot behavior field 32. Flow proceeds to step 120 to perform the robot behavior specified in the database 16 corresponding to the retrieved key.

The following is a description of the operation of the processor 17 according to the contents of scenario memory 15 with reference to FIGS. 3, 4 and 5.

First, the processor initializes the address pointer to "1" and examines the right-to-speak field 33 of entry #1 of the scenario memory 15 (step 101) and proceeds to step 102. In the entry #1, the right to speak is on the partner side and the robot's human partner is supposed to utter a self-introduction phrase as indicated in the partner's behavior field 31 and the processor proceeds to steps 103, 104 to examine the audience field 34. Since the audience field of entry #1 is marked with the symbol "x", flow proceeds to step 105 to turn the robot face toward the partner to sense his behavior (i.e., the uttered self-introduction phrase) by the analyzer 12 and compares the partner's behavior to the phrase specified in the partner's behavior field 31 for a match. If they match, flow proceeds through steps 121 and 122 and returns to step 101 to address the entry #2 of the scenario memory. Therefore, the processor performs the scenario of entry #1 by following steps 101-106, 121 and 122 (as indicated as pass 1 in FIG. 3).

In the entry #2, the right to speak is on the robot side (steps 101, 102). The processor proceeds from step 102 to step 115 to examine the audience field 34. Since it is marked with the symbol "x", the decision at step 116 is affirmative and the processor proceeds to step 120 to perform the robot behavior specified in the robot behavior field 32. Since the key B001 is marked in the robot behavior field 32, the robot is instructed to utter a self-introduction phrase such as "My name is PAPERO", and then proceeds through steps 121 and 122, incrementing the address pointer to "3" before returning to step 101. As a result, the processor performs the entry #2 by following steps 101, 102, 115, 116, 120~122 (as indicated as pass 2 in FIG. 3).

In the entry #3, the right to speak is on the partner side (steps 101, 102) and the partner is supposed to perform the behavior specified in the field 31. In this case, the partner is supposed to slap the robot on the head (i.e., the touch sensor 10). The processor proceeds to steps 103, 104 to examine the audience field 34. Since the audience field of entry #3 is marked with the symbol "x", flow proceeds to step 105 to compare the partner's behavior (i.e., the slapping on the robot's head) to the action specified in the partner's behavior field 31 for a match (step 106). If they match, flow proceeds from step 106 to step 122 via step 121 to increment the address pointer by one and returns to step 101. Therefore, the processor follows the pass 1 as in the case of entry #1 if the partner's behavior matches the specified scenario. If the partner fails to make a slapping action, the decision at step 106 is negative and the processor reads an urging phrase ("Slap My Head") from the database 16 corresponding to the key B002 specified in the robot's behavior field 32 (step 107) and flow proceeds through step 108 to step 109 to utter the retrieved urging phrase, and flow returns to step 105. As a result, when the partner fails to behave according to the specified scenario the processor performs steps 101~109, 121 and 122 (pass 3).

In the entry #4, the right to speak is again on the partner side (steps 101, 102) and the partner is supposed to utter a greeting phrase such as "Happy to See All of You!" The processor proceeds to steps 103, 104 to examine the audience field 34. Audience field of entry #4 is again marked with the symbol "x". Thus, flow proceeds to step 105 to compare the partner's utterance (i.e., the greeting phrase) to the phrase specified in the partner's behavior field 31 for a match (step 106). If they match, flow proceeds from step 106 to step 122 via step 121 to increment the address pointer to "5" and returns to step 101. If the partner forgets to utter the greeting phrase, the processor performs steps 101-109, 121 and 122 (pass 3) to read an urging phrase from the database 16 corresponding to the key B003 specified in the robot's behavior field 32 of entry #3 to urge the robot's partner to utter the missing phrase.

In the entry #5, the right to speak is on the robot side (steps 101, 102). The processor proceeds from step 102 to step 115 to examine the audience field 34, which contains an expected state of audience (large audience). The decision at step 116 is therefore negative and flow proceeds to step 117 to compare the sensed audience size (i.e., the number of people) to the expected large audience for a match (step 118). If they match, flow proceeds to step 120 to read a reactive phrase ("Hello, Everybody") from the database 16 corresponding to the key B004 specified in the upper sub-field of robot behavior field 32 and utter the retrieved phrase. At step 122, the processor increments the address pointer to "6" before returning to step 101. In this example, steps 101, 102, 115~118, 120~122 (pass 4) are executed.

If the sensed audience is small, the decision at step 118 is negative and flow proceeds to step 119 to make a search through the database 16 for one of the reactive behaviors using the output of the audience state analyzer 14 and performs the detected reactive behavior (step 120). In this case, steps 101, 102, 115~122 (pass 5) are executed.

In the entry #6, the right to speak is on the partner side (steps 101, 102) and the partner is supposed to utter an opening phrase such as "Today, We Are Going to Perform a Comic Dialogue!" The processor proceeds to steps 103, 104 to examine the audience field 34, which indicates large audience. Since the decision at step 104 is negative, flow proceeds to step 111 to compare the sensed audience state to the expected large audience for a match (step 112). If they match, flow proceeds through step 121 to step 122 to increment the address counter to "7". If the comparison at step 111 indicates that the sensed audience is small, the decision at step 112 is negative and flow proceeds to step 113 to make a search through the database 16 for a reactive robot behavior using the partner's behavior currently sensed by the partner's behavior analyzer 12 as a key. If a corresponding reactive robot behavior is detected (step 114), flow proceeds to step 120 to perform the detected behavior.

In the entry #7, the right to speak is on the robot side (steps 101, 102). The processor proceeds from step 102 to step 115 to examine the audience field 34, which contains an "X" mark. The decision at step 116 is therefore affirmative and flow proceeds to step 120 to read a comical phrase from the database 16 corresponding to the key B005 specified in the robot behavior field 32 and utter the retrieved comical phrase. At step 122, the processor increments the address pointer to "8" before returning to step 101. In this example, steps 101, 102, 115, 116, 120~122 (pass 2) are executed.

In the entry #8, the right to speak is again on the robot side (steps 101, 102). The processor proceeds from step 102 to step 115 to examine the audience field 34, which contains a "laughter" mark as an expected audience reaction. The decision at step 116 is negative and flow proceeds to step 117 to compare the output of the audience state analyzer 14 to the expected audience reaction for a match (step 118). If the robot's comical phrase of entry #7 has appealed to the audience, causing them to laugh, the decision at step 118 is affirmative, and flow proceeds to step 120 to read a reactive phrase from the database 16 corresponding to the key B006 specified in the robot behavior field 32 and utters the retrieved comical phrase. In this example, steps 101, 102, 115~118, 120~122 (pass 4) are executed, incrementing the address pointer to "9".

If the robot's comical phrase of entry #7 has not appealed to the audience, causing them to remain silent, the decision at step 118 for the current entry #8 is negative, and flow proceeds to step 119 to read reactive motion data from the database 16 corresponding to the audience reaction sensed by the audience state analyzer 14 and performs the retrieved reactive motion (step 120). In this example, steps 101, 102, 115-122 (pass 5) are executed.

In the entry #9, the right to speak is on the partner side (steps 101, 102) and the partner is supposed to utter a comical phrase. The processor proceeds to steps 103, 104 to examine the audience field 34, which indicates a laughter mark. Since the decision at step 104 is negative, flow proceeds to step 111 to compare the sensed audience state to the expected laughing state of the audience for a match (step 112). If the partner's comical phrase during the current entry is appealing to the audience, the decision at step 112 is affirmative and flow proceeds through step 121 to step 122 to increment the address pointer to the next. If the current partner's comical phrase is not appealing to the audience, the decision at step 112 is negative and flow proceeds to step 113 to make a search through the database 16 for a reactive robot behavior using the partner's behavior currently sensed by the partner's behavior analyzer 12 as a key. If a corresponding reactive robot behavior is detected (step 114), flow proceeds to step 120 to perform the detected behavior.

Figure 8:
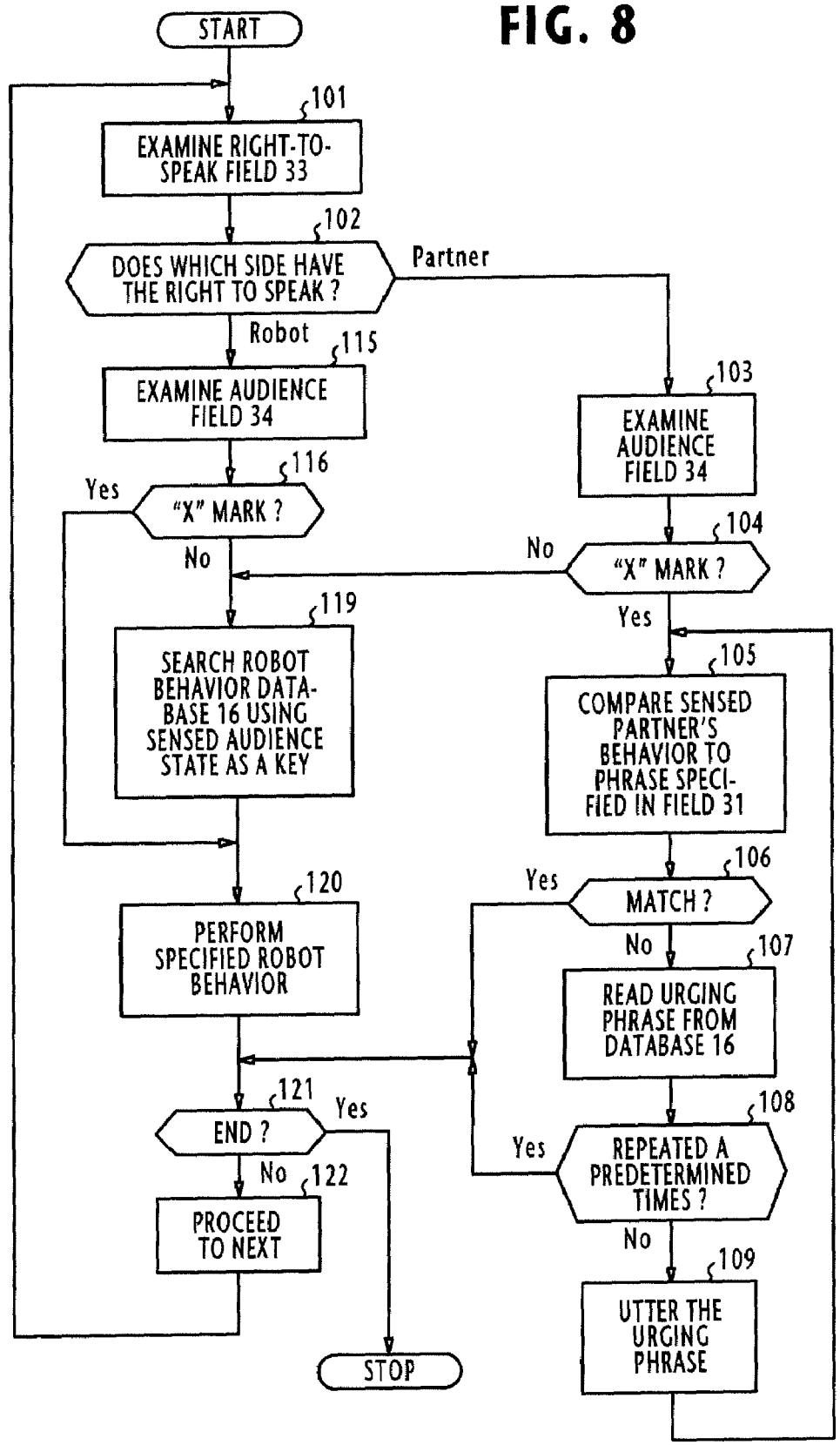
FIG. 8 is a flowchart of the operation of the processor according to the modification of the invention.

Scenario memory 15 is modified to include further entries #11, #12, and #13 as shown in FIG. 7 and the flowchart of FIG. 6 is modified as shown in FIG. 8.

In FIG. 7, the audience field 34 of each entry further includes a symbol "o" which indicates that the processor 17 should recognize the analyzed audience state. Depending on the recognized state, the processor determines its reactive phrase or motion.

The operation of the processor according to the flowchart of FIG. 8 proceeds as follows when the processor addresses the entries #11, #12 and #13 in succession.

In the entry #11, the right to speak is on the partner side (steps 101, 102) and the partner is supposed to utter a comical phrase. The processor proceeds to steps 103, 104 to examine the audience field 34, which contains the symbol "o". Since the decision at step 104 is negative, flow proceeds to step 119 to make a search through the database 16 for a corresponding robot behavior by using the audience state currently analyzed by the analyzer 14 as a key. At step 120, the processor performs the detected robot behavior.

If the comedian partner utters some comments on the audience and their atmosphere, the robot will analyze the audience reaction to that comments and acts in accordance with the analyzed audience reaction.

In the entry #12, the right to speak is on the robot side (steps 101, 102) and the robot proceeds to steps 115, 116 to examine the audience field 34, which contains the symbol "x". Since the decision at step 116 is affirmative, flow proceeds to step 120 to read a comical phrase from the database 16 corresponding to the key B006 specified in the robot behavior field 32 and utters the retrieved comical phrase.

In the entry #13, the right to speak is again on the robot side (steps 101, 102) and the robot proceeds to steps 115, 116 to examine the audience field 34, which contains the symbol "o". Since the decision at step 116 is negative, flow proceeds to step 119 to make a search through the database 16 for a corresponding robot behavior by using the audience state currently analyzed by the analyzer 14 as a key. At step 120, the processor performs the detected robot behavior.

In this way, enhanced reality can be given to the stage performance of a comic dialogue by a comedian and a robot by adaptively controlling the robot to different audience reactions.

Figure 9:
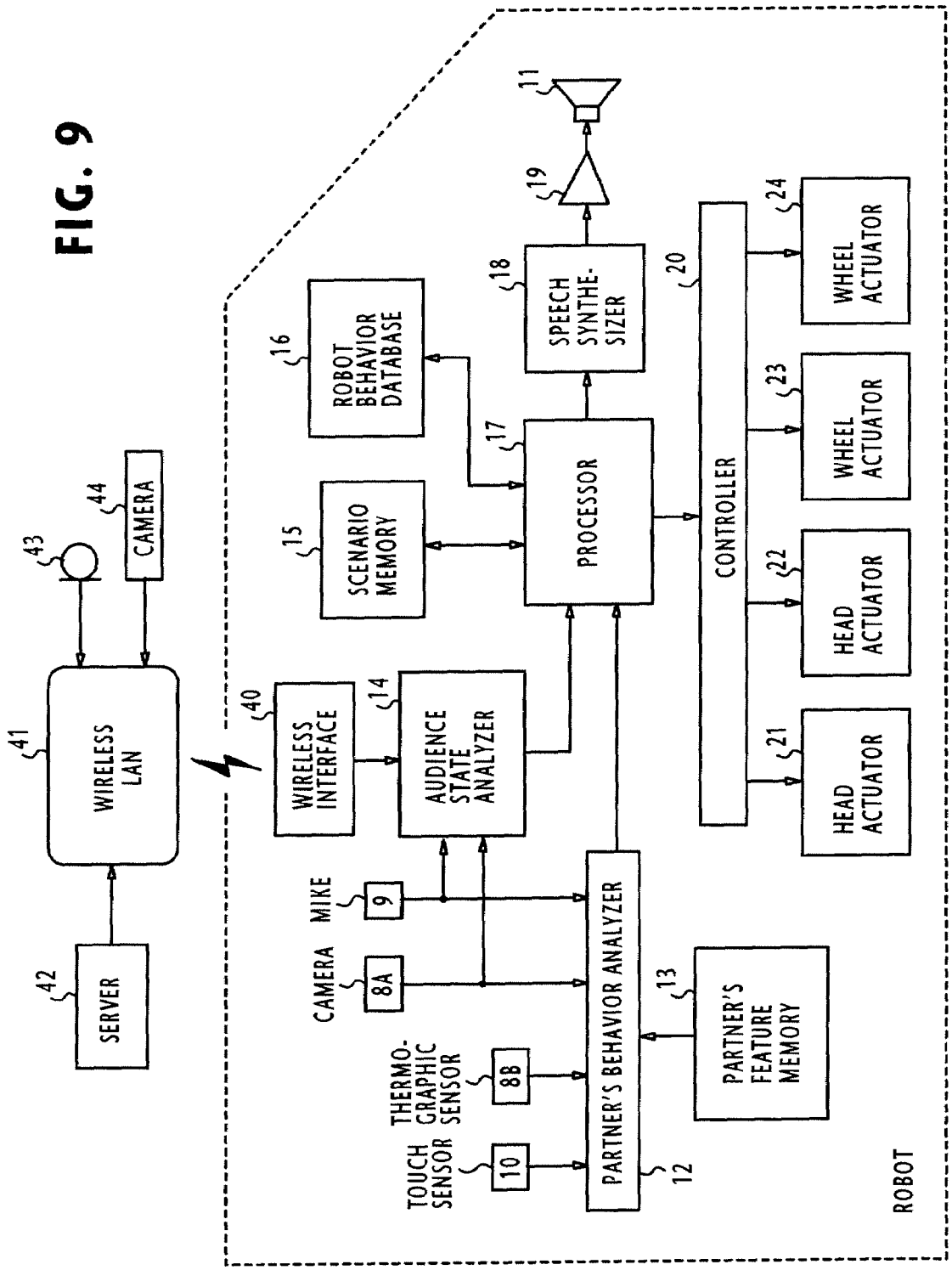
FIG. 9 is a block diagram of the robot according to a further modification of the first embodiment of the invention.

FIG. 9 illustrates a modification of the first embodiment of this invention. In this modification, the robot is additionally provided with a wireless interface 40 with which it establishes communication with a wireless LAN 41. To the wireless LAN 41 is connected a server 42, a microphone 43 and a CCD camera 44. CCD camera 44 is located in such a position that it can take the whole view of the audience and the microphone 43 is located near the audience to pick up their voice. Server 42 is used to store data indicating the number of sold tickets and the social classes of the audience. The stored data is transmitted from the server 42 via the wireless LAN 41 to the robot where the wireless interface 40 receives the transmitted data for application to the audience state analyzer 14. The outputs of the microphone 43 and camera 44 are also transmitted through the wireless LAN 41 to the robot as additional audience state data to the audience state analyzer 14.

It is seen from the foregoing description, the operation of the robot can be summarized as the following six modes:

In mode A, if (1) the partner has the right to speak, (2) no consideration of the audience is necessary and (3) the behavior of the partner is specified as A(x), then no behavior is performed by the robot if the recognized partner's behavior matches A(x). Otherwise, a specified robot behavior is performed.

In mode B, if (1) the robot has the right to speak, (2) no consideration of the audience is necessary and (3) no behavior of the partner is specified, then a predetermined behavior R(x) is performed by the robot and the program proceeds to the next entry;

In mode C, if (1) the robot has the right to speak, (2) consideration of the audience is necessary and (3) no behavior of the partner is specified, then a predetermined behavior R(x) is performed by the robot if the recognized state of the audience matches the expected state. Otherwise, the robot behavior database 16 is referenced using the recognized audience state;

In mode D, if (1) the partner has the right to speak, (2) consideration of the audience is necessary and (3) the behavior of the partner is specified as A(x), then no behavior is performed by the robot if the recognized state of the audience matches the expected state. Otherwise, the robot behavior database 16 is searched with the recognized partner's behavior as a key to perform a corresponding robot behavior.

Figure 10:
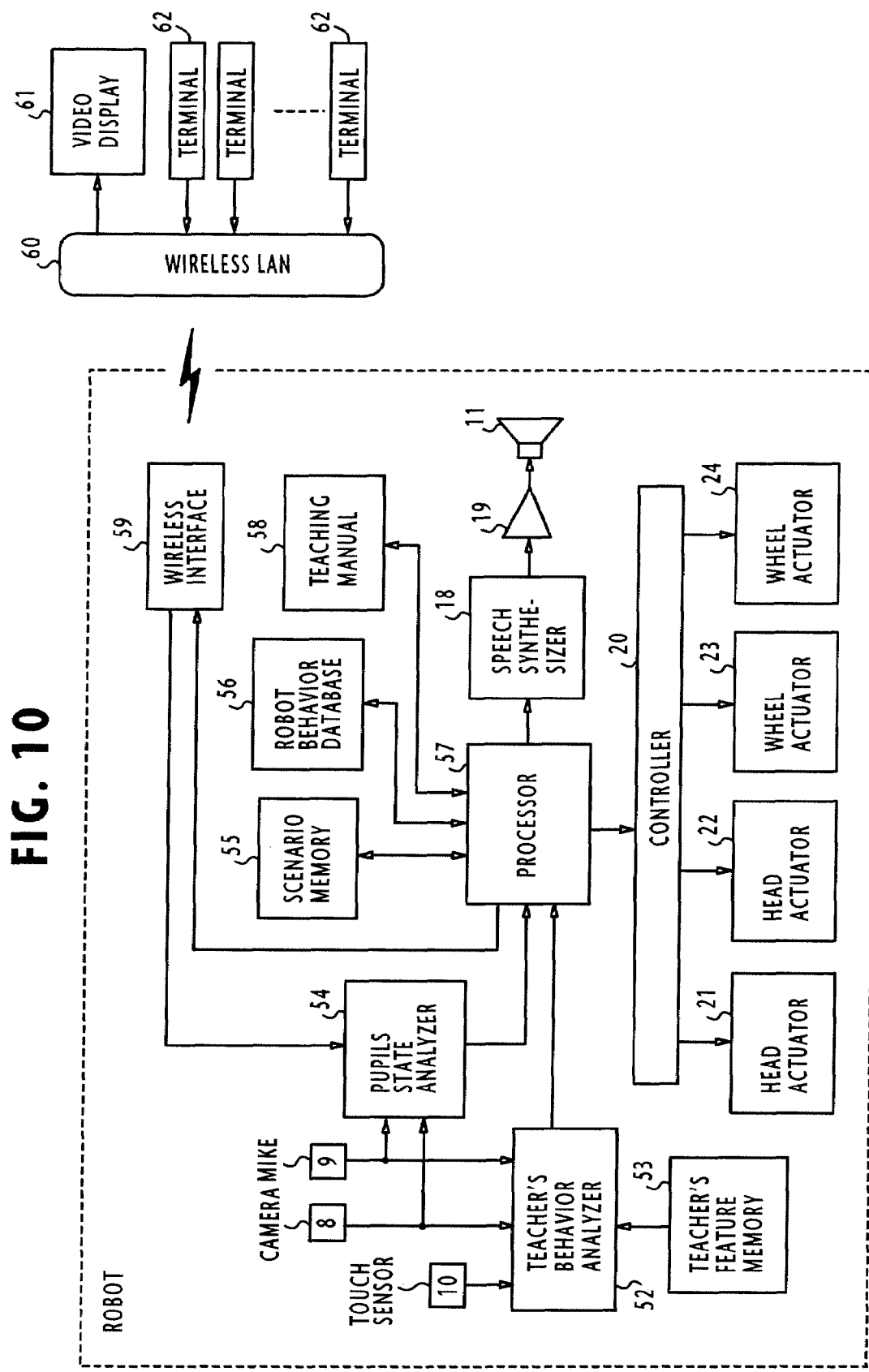
FIG. 10 is a block diagram of a robot according to a second embodiment of the present invention, in which the robot acts as an artificial assistance for a schoolteacher in a classroom for teaching a group of pupils.

In a second embodiment of the present invention, the robot is used as assistance for a schoolteacher in a classroom for teaching a group of school children. As shown in FIG. 10, the robot includes a teacher's behavior analyzer 52 to which the outputs of the microphone 9, cameras 8 and touch sensor 10 and a teacher's feature memory 53 are supplied in a manner similar to the first embodiment. A pupils state analyzer 54 is provided to receive the outputs of the microphone 9 and cameras 8 to determine the reaction of the pupils in the classroom. Similar to the first embodiment, scenario memory 55 and robot behavior database 56 are connected to the processor 57.

In this embodiment, the robot is additionally provided with a teaching manual memory 58 for supplying the processor 57 with teaching materials including both textual and pictorial data. Scenario memory 55 includes a plurality of phrases of a scenario to be uttered by the teacher and the robot in a manner similar to the previous embodiment for teaching a particular subject and may further include the identity of a teaching material to be displayed on the video screen in the classroom. Processor 57 transmits a teaching material supplied from the memory 58 to a wireless interface 59, which communicates with a wireless LAN 60 at intervals in response to a timing control signal, which may be stored in the scenario memory 55.

In the classroom, a video screen 61 is provided for displaying the teaching material supplied from the robot. Preferably, a plurality of computer terminals 62 are placed respectively on the pupil's desks. The teaching materials from the robot may also be displayed on the individual computer terminals 62. The pupils use the computer terminals 62 to input their answer in response to a teacher's question. Such input data are transmitted through the wireless LAN 61 to the robot, where the wireless interface 59 repeats it to the pupils state analyzer 54.

In the classroom, the robot stands in a position close to the schoolteacher. They perform a dialogue according to a scenario stored in the scenario memory 55. The dialogue will proceed in a different way depending on the pupils' reaction to what is being taught on a subject or how the subject is explained by the teacher. In this manner, an element of entertainment can be incorporated into the classroom teaching at appropriate timing so that the pupils keep their attention for an extended period of time on a subject of the type likely to cause distraction.

What is claimed is:

1. A robot comprising:
   a first analyzer for analyzing phrase and action of a human partner to detect a recognized behavior of the partner;
   a second analyzer for analyzing a state of a plurality of people listening to utterances from said partner and said robot to detect a recognized state of said people;
   a scenario memory for storing a scenario describing a dialogue between said partner and said robot; and
   a processor for making reference to a portion of said scenario in said memory according to the recognized behavior of said partner and the recognized state of said people, and determining a behavior of said robot according to the referenced portion of said scenario.

2. The robot of claim 1, wherein said scenario memory includes a plurality of entries, each of said entries containing a portion of said scenario to be uttered by one of said partner and said robot,
   wherein said processor successively makes reference to each of said entries, produces a predetermined utterance from the robot according to the referenced portion of said scenario and determines said behavior of said robot according to one of a recognized behavior of said partner currently detected by the first analyzer and a recognized state of said people currently detected by the second analyzer.

3. The robot of claim 2, further comprising a robot behavior database for mapping a plurality of recognized behaviors of said partner which will be detected by said fist analyzer to a plurality of predetermined robot behaviors,
   wherein the referenced entry indicates an expected state of said people, and
   wherein said processor compares a recognized state of said people currently detected by said second analyzer to the expected state of the referenced entry for a match or mismatch and determines said behavior of the robot according to the referenced portion of said scenario if there is a match between said recognized and expected states and according to one of said predetermined robot behaviors of said database corresponding to a recognized behavior of said partner currently detected by said first analyzer if there is a mismatch between said recognized and expected states.

4. The robot of claim 2, wherein each of said entries of said scenario memory indicates which one of said partner and said robot has the right to speak, and
   wherein said processor determines said behavior of said robot according to a recognized behavior of said partner currently detected by said first analyzer if the referenced entry indicates that said partner has the right to speak and according to a state of said people currently recognized by said second analyzer if said referenced entry indicates that said robot has the right to speak.

5. The robot of claim 4, wherein said processor compares a recognized behavior of said partner currently detected by the first analyzer to a predetermined behavior if the referenced entry indicates that said partner has the right to speak, and produces an utterance from the robot for urging the partner to perform said predetermined behavior if there is a mismatch between said recognized behavior said predetermined behavior.

6. The robot of claim 3, wherein each of said entries of said scenario memory indicates which one of said partner and said robot has the right to speak,
   wherein said database further maps a plurality of recognized states of said people which will be detected by said second analyzer to said plurality of predetermined robot behaviors,
   wherein said processor determines said behavior of said robot according to one of said predetermined robot behaviors corresponding to a recognized behavior of said partner currently detected by said first analyzer if the referenced entry indicates that said partner has the right to speak and according to one of said predetermined robot behaviors corresponding to a recognized state of said people currently detected by said second analyzer if the referenced entry indicates that said robot has the right to speak.

7. The robot of claim 6, wherein said processor compares a recognized behavior of said partner currently detected by the first analyzer to a predetermined partner's behavior if the referenced entry indicates that said partner has the right to speak, and produces an utterance from the robot for urging the partner to perform said predetermined partner's behavior if there is a mismatch between said recognized behavior said predetermined partner's behavior.

8. The robot of claim 2, further comprising a robot behavior database for mapping a plurality of recognized states of said people which will be detected by said second analyzer to a plurality of predetermined robot behaviors, and
   wherein said processor determines said behavior of the robot according to one of said predetermined robot behaviors of said database corresponding to a recognized state of said people currently detected by said second analyzer.

9. The robot of claim 1, wherein said dialogue stored in said scenario memory is a comic dialogue.

10. The robot of claim 1, wherein said first analyzer recognizes the behavior of said partner from a microphone and a video camera.

11. The robot of claim 1, wherein said second analyzer recognizes the state of said people from a microphone and a video camera.

12. The robot of claim 1, wherein said first analyzer recognizes the state of said partner from a thermographic sensor and a touch sensor for producing a signal when the touch sensor is in contact with said partner.

13. The robot of claim 11, wherein said robot has a torso and a head rotatable on said torso about a vertical axis, and wherein said video camera is mounted on said head.

14. The robot control system of claim 1, further comprising:
a video camera located external to said robot for detecting a view of said people; and
a microphone located external to said robot for detecting voices from said people,
said second analyzer being responsive to the detected view and the detected voices for recognizing said state of said people.

15. A method of controlling a robot, comprising the steps of:
a) storing a scenario describing a dialogue between a human partner and said robot in a memory;
b) analyzing phrase and action of a human partner to detect a recognized behavior of the partner and analyzing a state of a plurality of people listening to utterances from said partner and said robot to detect a recognized state of said people; and
c) making reference to a portion of said scenario in said memory according to at least one of the recognized behavior of said partner and the recognized state of said people and determining a behavior of said robot according to the referenced portion of said scenario.

16. The method of claim 15, wherein said scenario memory includes a plurality of entries, each of said entries contains a portion of said scenario to be uttered by one of said partner and said robot, and
wherein step (c) comprises the steps of:
successively making reference to each of said entries of said scenario memory;
producing a predetermined utterance from the robot according to the referenced portion of the scenario; and
determining said behavior of said robot according to one of a currently recognized behavior of said partner and a currently recognized state of said people.

17. The method of claim 16, wherein a robot behavior database is provided for mapping a plurality of recognized behaviors of said partner which will be detected to a plurality of predetermined robot behaviors, and wherein each of said entries indicates an expected state of said people,
wherein step (c) comprises the steps of:
comparing a currently recognized state of said people to said expected state for a match or mismatch; and
determining said behavior of the robot according to the referenced portion of said scenario if there is a match between said recognized and expected states and according to one of said predetermined robot behaviors of said database corresponding to a currently recognized behavior of said partner if there is a mismatch between said recognized and expected states.

18. The method of claim 16, wherein each of said entries of said scenario memory indicates which one of said partner and said robot has the right to speak, and
wherein step (c) comprises the step of determining said behavior of said robot according to a currently recognized behavior of said partner if the referenced entry indicates that said partner has the right to speak and according to a currently recognized state of said people if said referenced entry indicates that said robot has the right to speak.

19. The method of claim 18, wherein step (c) comprises the steps of:
comparing a currently recognized behavior of said partner to a predetermined behavior if the referenced entry indicates that said partner has the right to speak; and
producing an utterance from the robot for urging the partner to perform said predetermined behavior if there is a mismatch between said recognized behavior said predetermined behavior.

20. The method of claim 17, each of said entries of said scenario memory indicates which one of said partner and said robot has the right to speak, and wherein said database further maps a plurality of recognized states of said people which will be detected by said second analyzer to said plurality of predetermined robot behaviors,
wherein step (c) comprises the step of determining said behavior of said robot according to one of said predetermined robot behaviors corresponding to a currently recognized behavior of said partner if the referenced entry indicates that said partner has the right to speak and according to one of said predetermined robot behaviors corresponding to a currently recognized state of said people if the referenced entry indicates that said robot has the right to speak.

21. The method of claim 20, wherein step (c) comprises the steps of:
comparing a currently recognized behavior of said partner to a predetermined partner's behavior if the referenced entry indicates that said partner has the right to speak; and
producing an utterance from the robot for urging the partner to perform said predetermined partner's behavior if there is a mismatch between said recognized behavior said predetermined partner's behavior.

22. The method of claim 16, wherein a robot behavior database is provided for mapping a plurality of recognized states of said people which will be detected to a plurality of predetermined robot behaviors, and
wherein step (c) comprises the step of determining said behavior of the robot according to one of said predetermined robot behaviors of said database corresponding to a currently recognized state of said people.

23. The method of claim 15, wherein said dialogue stored in said scenario memory is a comic dialogue.

* * * * *